(12) United States Patent
Takiguchi et al.

(10) Patent No.: US 12,299,560 B2
(45) Date of Patent: May 13, 2025

(54) NEURAL NETWORK PROCESSING DEVICE

(71) Applicant: Samsung Display Co., Ltd., Yongin-Si (KR)

(72) Inventors: Masahiko Takiguchi, Yokohama (JP); Kazuhiro Matsumoto, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 896 days.

(21) Appl. No.: 17/476,905

(22) Filed: Sep. 16, 2021

(65) Prior Publication Data

US 2022/0207335 A1 Jun. 30, 2022

(30) Foreign Application Priority Data

Dec. 24, 2020 (KR) .................. 10-2020-0183601

(51) Int. Cl.
*G06N 3/063* (2023.01)
*G06N 3/08* (2023.01)

(52) U.S. Cl.
CPC .............. *G06N 3/063* (2013.01); *G06N 3/08* (2013.01)

(58) Field of Classification Search
CPC ............................. G06N 3/063; G06N 3/0464
See application file for complete search history.

(56) References Cited

U.S. PATENT DOCUMENTS

| 10,671,922 B2 | 6/2020 | Ioffe |
| 2019/0042948 A1 | 2/2019 | Lee et al. |
| 2020/0026986 A1 | 1/2020 | Ha et al. |
| 2020/0193293 A1 | 6/2020 | Song et al. |
| 2020/0218964 A1 | 7/2020 | Nakahara |

FOREIGN PATENT DOCUMENTS

| JP | 201957072 A | 4/2019 |
| JP | 2020506488 A | 2/2020 |
| JP | 202060967 A | 4/2020 |
| KR | 1020190014900 A | 2/2019 |
| KR | 1020190125141 A | 11/2019 |
| KR | 1020200072308 A | 6/2020 |

(Continued)

OTHER PUBLICATIONS

Ge, Jiexian, et al. "BNReLU: Combine batch normalization and rectified linear unit to reduce hardware overhead." 2019 IEEE 13th International Conference on ASIC (ASICON). IEEE, 2019. (Year: 2019).*

(Continued)

*Primary Examiner* — Schyler S Sanks
(74) *Attorney, Agent, or Firm* — CANTOR COLBURN LLP

(57) ABSTRACT

A neural network processing device includes: a convolution part which receives an input signal and a learning completion weight parameter, performs a convolution operation on the input signal and the learning completion weight parameter, and outputs a convolution signal that is a result value of the convolution operation; a batch adjustment which receives the convolution signal and a learning completion normalization parameter, and outputs an adjustment signal obtained by adjusting an output deviation of the convolution signal; and an activation part which converts the adjustment signal into an output signal based on an activation function.

16 Claims, 4 Drawing Sheets

(56) References Cited

FOREIGN PATENT DOCUMENTS

KR     1020200121497 A     10/2020
WO       2019076866 A1     4/2019

OTHER PUBLICATIONS

Ding, Bin, Huimin Qian, and Jun Zhou. "Activation functions and their characteristics in deep neural networks." 2018 Chinese control and decision conference (CCDC). IEEE, 2018. (Year: 2018).*

Cai, Wen-Pu, and Wu-Jun Li. "Weight normalization based quantization for deep neural network compression." arXiv preprint arXiv: 1907.00593 (2019) (Year: 2019).*

"Can someone explain MaxAbsScaler in Scikit-learn?", Oct. 15, 2019, https://stackoverflow.com/questions/58372209/can-someone-explain-maxabsscaler-in-scikit-learn (Year: 2019).*

Krishnamoorthi, Raghuraman. "Quantizing deep convolutional networks for efficient inference: A whitepaper." arXiv preprint arXiv: 1806.08342 (2018). (Year: 2018).*

Choi, Jungwook, et al. "Accurate and efficient 2-bit quantized neural networks." Proceedings of Machine Learning and Systems 1 (2019): 348-359. (Year: 2018).*

* cited by examiner

NEURAL NETWORK PROCESSING DEVICE

This application claims priority to Korean Patent Application No. 10-2020-0183601 filed on Dec. 24, 2020, and all the benefits accruing therefrom under 35 U.S.C. § 119, the content of which in its entirety is herein incorporated by reference.

BACKGROUND

Embodiments of the present disclosure described herein relate to a neural network processing device, and more particularly, relate to a neural network processing device for processing an image signal.

A performance of a convolutional neural network ("CNN") in image recognition has been improved, and many studies have been conducted such as additional performance improvement and application to various problems. As a result, sufficient detection performance has been obtained, and studies on small-scale network construction and hardware mounting for commercialization are increasing.

SUMMARY

Embodiments of the present disclosure provide a neural network processing device that is easy to mount in hardware.

According to an embodiment of the present disclosure, a neural network processing device includes: a convolution part which receives an input signal and a learning completion weight parameter, performs a convolution operation on the input signal and the learning completion weight parameter, and outputs a convolution signal that is a result value of the convolution operation; a batch adjustment part which receives the convolution signal and a learning completion normalization parameter and outputs an adjustment signal obtained by adjusting an output deviation of the convolution signal; and an activation part which converts the adjustment signal into an output signal based on an activation function.

According to an embodiment, the activation part may normalize the output signal to a value between 0 and 1.

According to an embodiment, the learning completion weight parameter may be calculated by Equation $$w' = \frac{w}{\max(|w|)},$$

where w is a learning parameter.

According to an embodiment, the learning completion normalization parameter may be normalized to a value between −1 and 1.

According to an embodiment, the convolution part may include a multiplier which multiplies the input signal and the learning completion weight parameter, and a quantizer which quantizes an output of the multiplier and outputs the convolution signal.

According to an embodiment, the quantizer may perform a quantization operation corresponding to Equation $$z_q = \begin{cases} M & z > M \\ \mathrm{round}(z \times 2^{t-1} \div M) \div 2^{t-1} \times M & -M < x \le M \\ -M & z \le M \end{cases},$$

where z is the output of the multiplier, 't' is a bit width of the convolution signal, M is a maximum value in a range −a to b, a and b are natural numbers other than 1, and $z_q$ is the convolution signal.

According to an embodiment, the learning completion normalization parameter may include a first parameter and a second parameter, and the batch adjustment part may include a multiplier which multiplies the convolution signal and the first parameter, a first quantizer which quantizes an output of the multiplier, an adder which adds an output of the first quantizer and the second parameter, and a second quantizer which quantizes an output of the adder.

According to an embodiment, the first parameter may be a value calculated by Equation $$A' = \frac{\max(|w|)}{\max(|y|)} A,$$

where max(|w|) is a maximum value of an absolute value of a learning parameter w, max(|y|) is a maximum value of an absolute value of the output signal y, $$A = \frac{\gamma}{\sigma_B},$$

is the learning parameter, and $\sigma_B$ is a standard deviation of the input signal.

According to an embodiment, the second parameter may be a value calculated by Equation $$B' = \frac{B}{\max(|y|)},$$

where max(|y|) is a maximum value of an absolute value of the output signal y, $$B = \beta - \frac{\mu_B \gamma}{\sigma_B},$$

each of γ and β is a learning parameter, $\mu_B$ is a mean of the input signal, and $\sigma_B$ is a standard deviation of the input signal.

According to an embodiment, the activation part may convert the adjustment signal into the output signal to have a value between 0 and 1, based on the activation function.

According to an embodiment, the input signal may be an image signal.

According to an embodiment of the present disclosure, a neural network processing device includes an input layer, an intermediate layer, and an output layer. The intermediate layer includes: a convolution part which receives an input signal and a learning completion weight parameter from the input layer, performs a convolution operation on the input signal and the learning completion weight parameter, and outputs a convolution signal that is a result value of the convolution operation; a batch adjustment part which receives the convolution signal and a learning completion normalization parameter and outputs an adjustment signal obtained by adjusting an output deviation of the convolution signal; and an activation part which converts the adjustment signal into an output signal based on an activation function and outputs the output signal to the output layer.

According to an embodiment, the activation part may normalize the output signal to a value between 0 and 1.

According to an embodiment, the learning completion weight parameter may be calculated by Equation $$w' = \frac{w}{\max(|w|)},$$

where w is a learning parameter.

According to an embodiment, the learning completion normalization parameter may be normalized to a value between −1 and 1.

According to an embodiment, the convolution part may include: a multiplier which multiplies the input signal and the learning completion weight parameter; and a quantizer which quantizes an output of the multiplier and outputs the convolution signal.

According to an embodiment, the quantizer may perform a quantization operation corresponding to Equation $$z_q = \begin{cases} M & z > M \\ \text{round}(z \times 2^{t-1} \div M) \div 2^{t-1} \times M & -M < z \leq M, \\ -M & z \leq M \end{cases}$$

where z is the output of the multiplier, t is a bit width of the convolution signal, M is a maximum value in a range −a to b, a and b are natural numbers other than 1, and $z_q$ is the convolution signal.

According to an embodiment, the learning completion normalization parameter may include a first parameter and a second parameter, and the batch adjustment part may include a multiplier which multiplies the convolution signal and the first parameter, a first quantizer which quantizes an output of the multiplier, an adder which adds an output of the first quantizer and the second parameter, and a second quantizer which quantizes an output of the adder.

According to an embodiment, the first parameter may be a value calculated by Equation $$A' = \frac{\max(|w|)}{\max(|y|)} A,$$

where max(|w|) is a maximum value of an absolute value of a learning parameter w, max(|w|) is a maximum value of an absolute value of the output signal y, $$A = \frac{\gamma}{\sigma_B}, \gamma$$

is the learning parameter, and $\sigma_B$ is a standard deviation of the input signal.

According to an embodiment, the second parameter may be a value calculated by Equation $$B' = \frac{B}{\max(|y|)},$$

where max(|y|) is a maximum value of an absolute value of the output signal y, $$B = \beta - \frac{\mu_B \gamma}{\sigma_B},$$

where each of γ and β is a learning parameter, $\mu_B$ is a mean of the input signal, and $\sigma_B$ is a standard deviation of the input signal.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
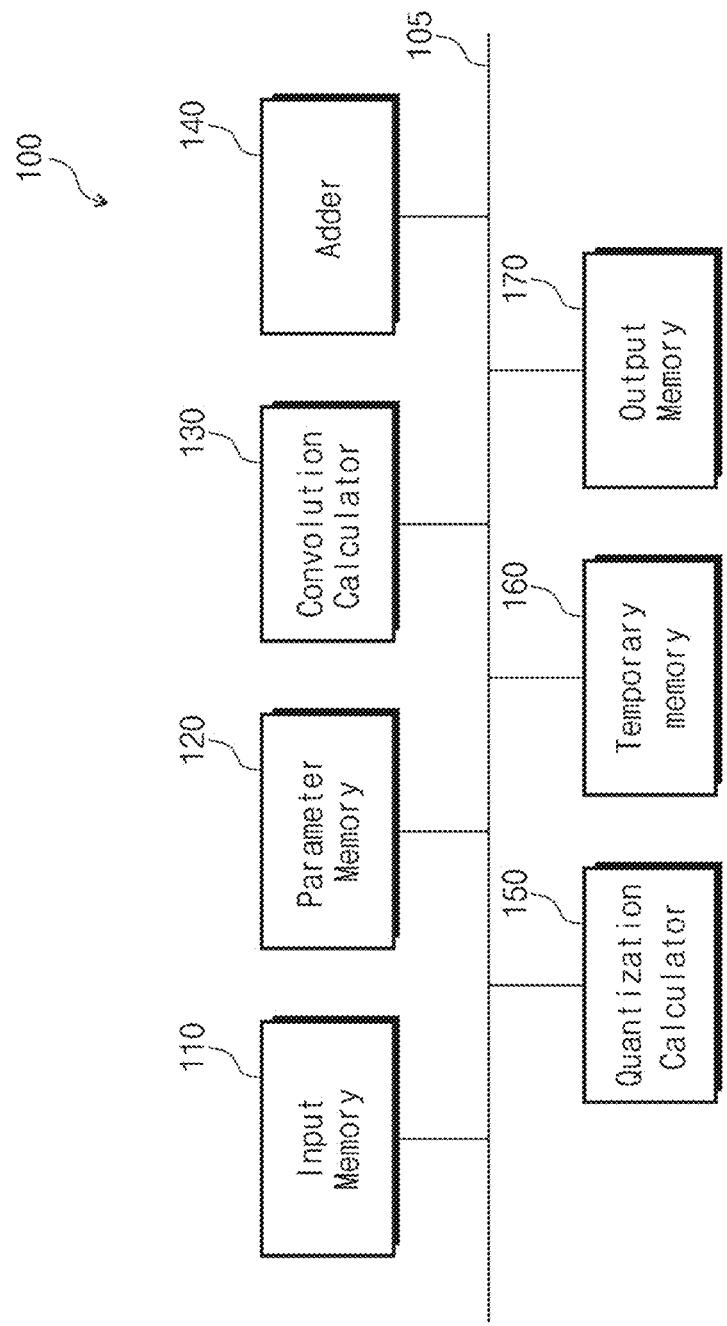
FIG. 1 is a block diagram of a neural network processing device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or" includes one or more combinations of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms" "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

FIG. 1 is a block diagram of a neural network processing device according to an embodiment of the present disclosure.

Referring to FIG. 1, a neural network processing device 100 includes an input memory 110, a parameter memory 120, a convolution calculator 130, an adder 140, a quantization calculator 150, a temporary memory 160, and an output memory 170. The input memory 110, the parameter memory 120, the convolution calculator 130, the adder 140, the quantization calculator 150, the temporary memory 160, and the output memory 170 may transmit and receive signals to and from one another through a bus 105.

Each of the input memory 110, the parameter memory 120, the temporary memory 160, and the output memory 170 may be a buffer. In FIG. 1, the input memory 110, the parameter memory 120, the temporary memory 160, and the output memory 170 are illustrated and described as being independent components, but the present disclosure according to the invention is not limited thereto. For example, the input memory 110, the parameter memory 120, the temporary memory 160, and the output memory 170 may be implemented using one memory in another embodiment.

In FIG. 1, the convolution calculator 130, the adder 140, and the quantization calculator 150 are illustrated and described as being independent components, but the present disclosure according to the invention is not limited thereto. For example, the convolution calculator 130, the adder 140, and the quantization calculator 150 may be implemented with a single processor in another embodiment.

The input memory 110 stores an input signal from the outside. The input signal may be an image signal. In an embodiment, the input signal provided to the input memory 110 may be a preprocessed image signal. For example, the input signal may be an image signal on which image processing such as black-and-white conversion, contrast adjustment, and brightness adjustment is performed.

The parameter memory 120 stores one or more parameters. The parameters may include learning parameters. The parameter may be a preset value.

The temporary memory 160 may be a memory that temporarily stores outputs of the convolution calculator 130, the adder 140, and the quantization calculator 150.

The output memory 170 may store a final output signal of the neural network processing device 100.

The convolution calculator 130 may perform a convolution operation on the input signal stored in the input memory 110 and the parameter stored in the parameter memory 120. In addition, the convolution calculator 130 may perform a convolution operation on an intermediate operation result stored in the temporary memory 160 and the parameter stored in the parameter memory 120.

The quantization calculator 150 performs a quantization operation on a signal output from one of the convolution calculator 130 and the adder 140.

Figure 2:
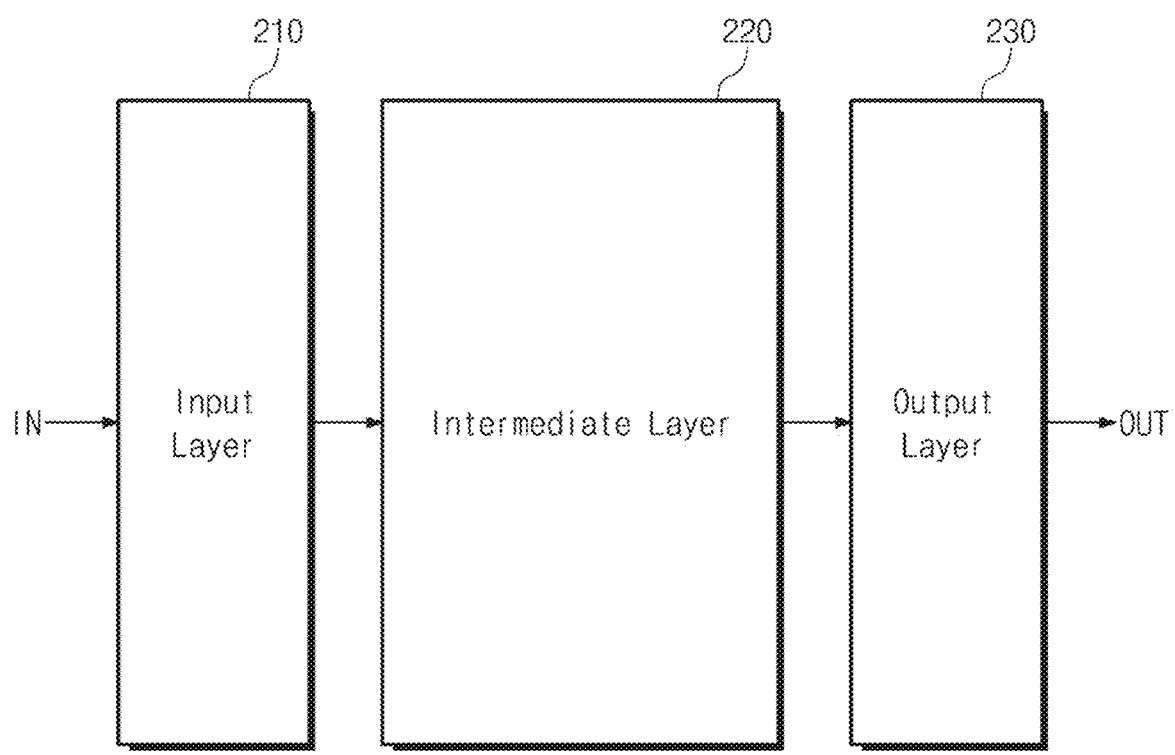
FIG. 2 is a diagram describing an operation of a neural network processing device.

FIG. 2 is a diagram describing an operation of a neural network processing device.

Referring to FIG. 2, a neural network processing device may include an input layer 210, an intermediate layer 220, and an output layer 230.

Each of the input layer 210, the intermediate layer 220, and the output layer 230 may represent operations performed by the hardware configuration illustrated in FIG. 1.

The input layer 210 may include an operation of storing the input signal in the input memory 110 and an operation of storing the parameter (or learning parameter) in the parameter memory 120. A signal IN provided to the input layer 210 may include input signals $X[i]$ to $X[i+9]$ and parameters $w'[i]$ to $w'[i+9]$ illustrated in FIG. 3.

The intermediate layer 220 may include operations of the convolution calculator 130, the adder 140, and the quantization calculator 150. In detail, the intermediate layer 220 may be performed by at least one of the convolution calculator 130, the adder 140, and the quantization calculator 150.

The output layer 230 may include an operation of outputting an output signal OUT stored in the output memory 170.

Figure 3:
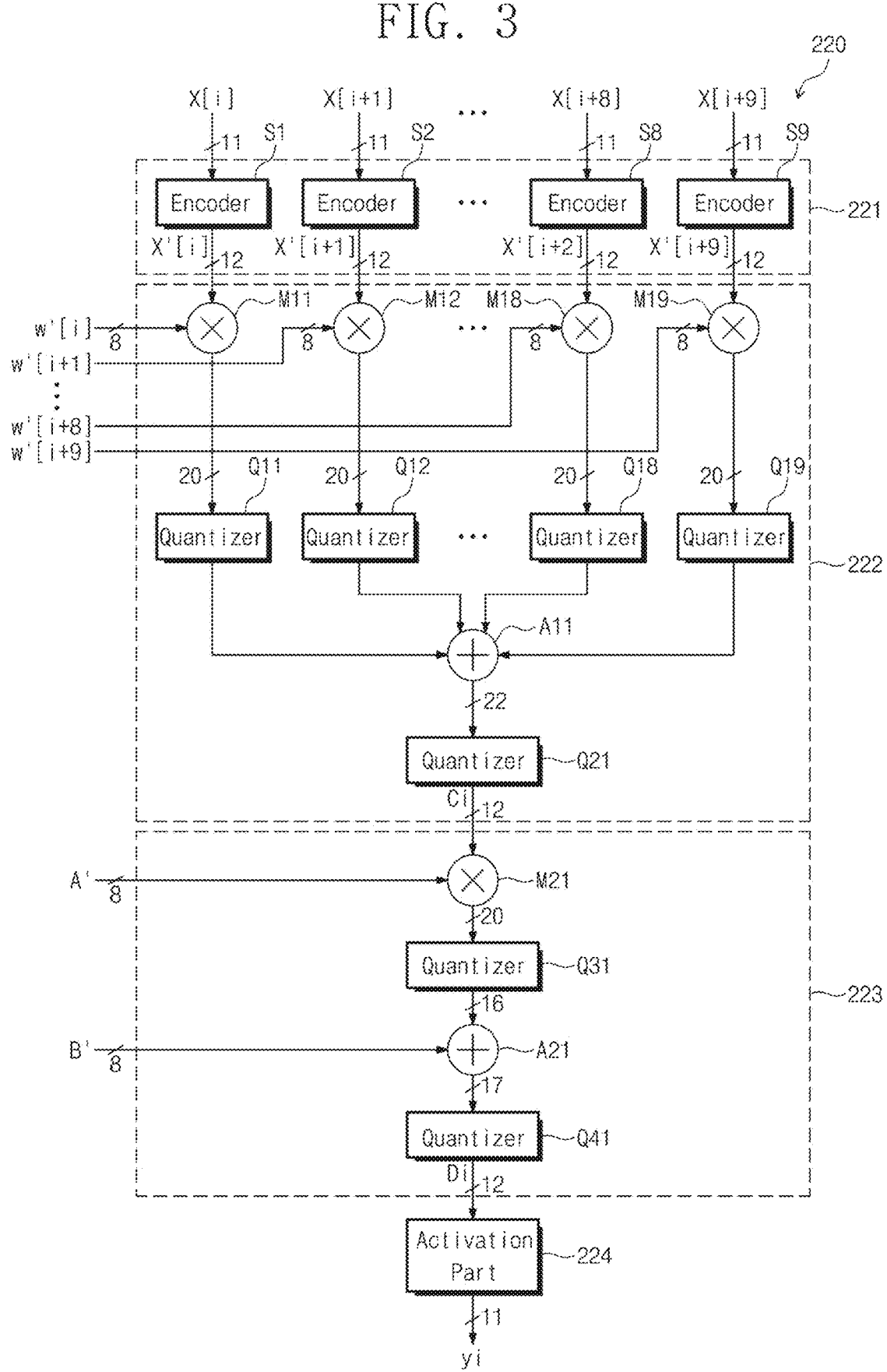
FIG. 3 is a block diagram describing a function of an intermediate layer illustrated in FIG. 2.

FIG. 3 is a block diagram describing a function of an intermediate layer illustrated in FIG. 2.

Each of the functional blocks illustrated in FIG. 3 may be operated by the neural network processing device 100 illustrated in FIG. 1.

Referring to FIGS. 1 and 3, the intermediate layer 220 of a neural network processing device 100 receives the input signals $X[i]$ to $X[i+9]$ and parameters $w'[i]$ to $w'[i+9]$, and A' and B'. The input signals $X[i]$ to $X[i+9]$ are provided from the input memory 110, and the parameters $w'[i]$ to $w'[i+9]$, and A' and B' are provided from the parameter memory 120. Each of the parameters $w'[i]$ to $w'[i+9]$ may be referred to as a learning completion weight parameter, and each of the parameters A' and B' may be referred to as a learning completion normalization parameter.

The intermediate layer 220 of the neural network processing device 100 includes an encoding part 221, a convolution part 222, a batch adjustment part 223, and an activation part 224.

Each of the input signals $X[i]$ to $X[i+9]$ may be an unsigned 11-bit signal. Each of the parameters $w'[i]$ to $w'[i+9]$, and A' and B' is a parameter obtained by learning and may be an 8-bit signal.

The encoding part 221 includes encoders S1 to S9. The encoders S1 to S9 receive the input signals $X[i]$ to $X[i+9]$, respectively. Each of the encoders S1 to S9 adds a sign bit to the input signals $X[i]$ to $X[i+9]$ by 1 bit. Therefore, each of input signals $X'[i]$ to $X'[i+9]$ output from the encoding part 221 may be 12 bits.

The convolution part 222 performs a convolution operation on the input signals $X'[i]$ to $X'[i+9]$ output from the encoding part 221 and the parameters $w'[i]$ to $w'[i+9]$, and outputs a convolution signal Ci. The convolution signal Ci may be stored in the temporary memory 160.

The convolution part 222 includes multipliers M11 to M19, quantizers Q11 to Q19 and Q21, and an adder A11.

The multipliers M11 to M19 receives the input signals $X'[i]$ to $X'[i+9]$, respectively. The number of multipliers M11 to M19 may be determined depending on the number of input signals X'[i] to X'[i+9]. For example, the number of multipliers M11 to M19 may be the same as the number of input signals X'[i] to X'[i+9].

Each of the multipliers M11 to M19 multiplies a corresponding input signal among the input signals X'[i] to X'[i+9] by a corresponding parameter among the parameters w'[i] to w'[i+9]. Multiplication results with 20 bits may be output by multiplying the input signals X'[i] to X'[i+9] with a bit width of 12 bits by the parameters w'[i] to w'[i+9] with a bit width of 8 bits, respectively.

The quantizers Q11 to Q19 correspond to the multipliers M11 to M19, respectively. The number of quantizers Q11 to Q19 may be determined depending on the number of multipliers M11 to M19. For example, the number of quantizers Q11 to Q19 may be the same as the number of multipliers M11 to M19.

Each of the quantizers Q11 to Q19 may convert a 20-bit multiplication result output from a corresponding one of the multipliers M11 to M19 into a 16-bit signal.

The adder A11 adds the outputs from the quantizers Q11 to Q19. A signal output from the adder A11 may be 22 bits.

The quantizer Q21 may convert the 22-bit signal output from the adder A11 into a 12-bit convolution signal Ci.

The batch adjustment part 223 receives the convolution signal Ci and the parameters A' and B'. The batch adjustment part 223 outputs an adjustment signal Di obtained by adjusting an output deviation of the convolution signal Ci.

The batch adjustment part 223 includes a multiplier M21, an adder A21, and quantizers Q31 and Q41.

The multiplier M21 multiplies the convolution signal Ci received from the convolution part 222 by the parameter A'. Since the bit width of the convolution signal Ci is 12 bits and the bit width of the parameter A' is 8 bits, the bit width of a signal output from the multiplier M21 may be 20 bits.

The quantizer Q31 may convert the 20-bit signal output from the multiplier M21 into a 16-bit signal.

The adder A21 adds the output of the quantizer Q31 to the parameter B'. Since the bit width of the signal output from the quantizer Q31 is 16 bits and the bit width of the parameter B' is 8 bits, a bit width of the signal output from the adder A21 may be 17 bits.

The quantizer Q41 may output the adjustment signal Di obtained by converting the 17-bit signal output from the adder A21 into a 12-bit signal.

The activation part 224 outputs an output signal yi between 0 and 1, based on an activation function (reLU). Since the activation part 224 converts the output signal yi into 0 when the adjustment signal Di is negative, the bit width of the adjustment signal Di output from the activation part 224 may be 11 bits.

An operation of the convolution part 222 is expressed in Equation 1 below.

$$h_i = \sum_d x[i+d]w[d] \qquad \text{[Equation 1]}$$

In Equation 1, x[i+d] is an input signal, and w[d] is a parameter. FIG. 3 illustrates a case of d=9.

When Equation 1 is normalized, the normalized Equation 1 is the same as Equation 2.

$$y_i = \frac{h_i - \mu_B}{\sigma_B} \times \gamma + \beta \qquad \text{[Equation 2]}$$

In Equation 2, the mean $\mu_B$ may be expressed by Equation 3, and the standard deviation $\sigma_B$ may be expressed by Equation 4.

$$\mu_B = \frac{1}{m}\sum_{i=1}^{m} h_i \qquad \text{[Equation 3]}$$

$$\sigma_B = \sqrt{\frac{1}{m}\sum_{i=1}^{m}(h_i - \mu_B)^2 + E} \qquad \text{[Equation 4]}$$

In Equation 2, each of $\gamma$ and $\beta$ is a learning parameter.

In general, since the input signal, the learning parameters, and the output signal are 32-bit floating-point types, to implement the neural network in hardware, miniaturization is desirable by converting to a fixed-point type and reducing the number of bits.

Since the learning parameters $\gamma$ and $\beta$ are determined when the learning is finished, Equation 2 may be transformed into Equation 5.

$$y_i = h_i \times A + B \qquad \text{[Equation 5]}$$

In Equation 5, A may be expressed by Equation 6, and B may be expressed by Equation 7.

$$A = \frac{\gamma}{\sigma_B} \qquad \text{[Equation 6]}$$

$$B = \beta - \frac{\mu_B \gamma}{\sigma_B} \qquad \text{[Equation 7]}$$

Equation 8 is obtained by substituting Equation 5 into Equation 1.

$$y_i = \left(\sum_d x[i+d]w[d]\right) \times A + B \qquad \text{[Equation 8]}$$

The output signal yi of Equation 8 may be calculated by one multiplication operation of the learning parameter A and one addition operation of the learning parameter B.

However, in Equation 8, the operation of $$\sum_d x[i+d]w[d]$$

is obtained by performing d times of multiplication operations and d times of addition operations. In FIG. 3 and Equations 1 to 8, the number of input signals is expressed as d for convenience of description, but in the actual neural network, a three-dimensional convolution operation is desirable, like the number of vertical direction input signals x the number of horizontal direction input signals x the number of nodes. That is, the example of the three-dimensional convolution operation is to multiply the number of vertical direction input signals by the number of horizontal direction input signals, and then multiply the result by the number of nodes.

In an embodiment, for example, when the number of vertical direction input signals, the number of horizontal direction input signals, and the number of nodes are 5, 5, and 16, respectively, the operation $$\sum_d x[i+d]w[d]$$

of Equation 8 should be performed 400 times of multiplication operations and 399 times of addition operations.

In this case, when a range of an input signal x and a parameter w is normalized to −1 to 1, an output range of the multiplier may be −1 to 1, and an output range of the adder may be −400 to 400.

Equation 8 may be modified to Equation 9.

$$y_i = \left(\sum_d x[i+d]w'[d]\right) \times A' + B' \qquad \text{[Equation 9]}$$

In Equation 9, the learning completion weight parameter w' may be expressed by Equation 10, the learning completion normalization parameter A' may be expressed by Equation 11, and the learning completion normalization parameter B' may be expressed by Equation 12.

$$w' = \frac{w}{\max(|w|)} \qquad \text{[Equation 10]}$$

In Equation 10, max(|w|) denotes a maximum value of an absolute value of the learning parameter w.

$$A' = \frac{\max(|w|)}{\max(|y|)} A \qquad \text{[Equation 11]}$$

$$B' = \frac{B}{\max(|y|)} \qquad \text{[Equation 12]}$$

In Equations 11 and 12, max(|y|) denotes the maximum value of an absolute value of the output signal y. In Equations 11 and 12, the output signal y may be a preset value in the learning operation.

The number of multiplication and addition operations of Equation 9 is the same as the number of Equation 8. However, the range of the parameter w' of Equation 9 is normalized to −1 to 1, and the range of the output signal y is normalized to 0 to 1. An exact range of the parameter w' may be determined after the learning is completed.

Figure 4:
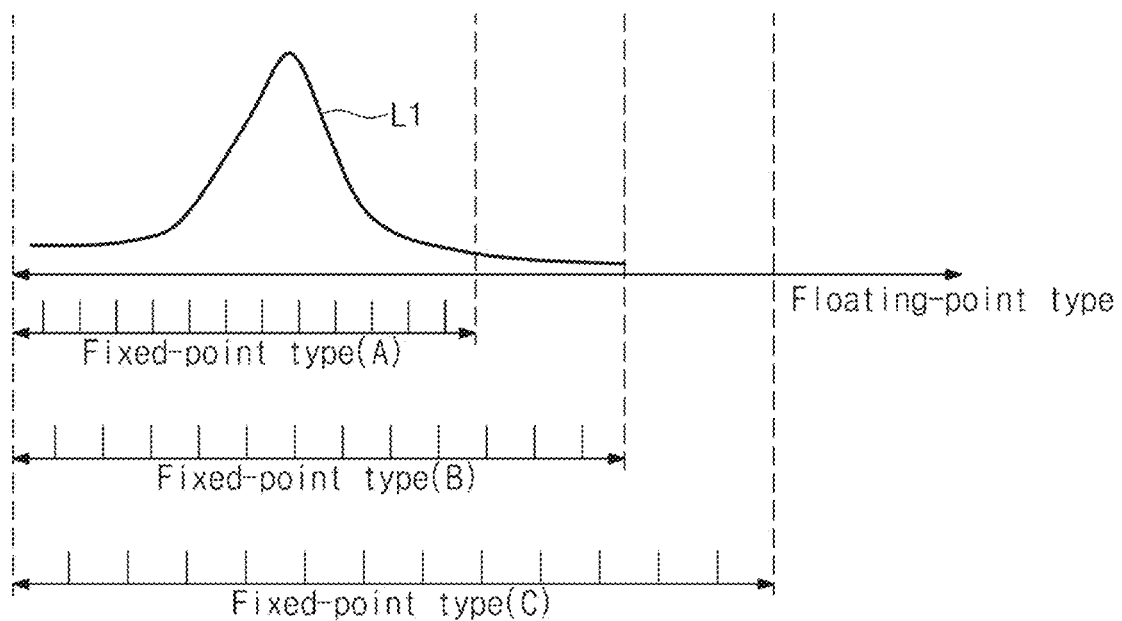
FIG. 4 is a diagram describing an operation of quantizers illustrated in FIG. 3.

FIG. 4 is a diagram describing an operation of quantizers illustrated in FIG. 3. In the following description, the quantizer Q11 is described as an example, but other quantizers Q12 to Q19, Q21, Q31, and Q41 may also operate in a similar manner to the quantizer Q11.

In FIG. 4, a curve L1 represents a distribution (occurrence frequency) of the 20-bit signal output from the multiplier M11.

Referring to FIG. 4, the quantizer Q11 converts the 20-bit signal output from the multiplier M11 into the 16-bit signal. When the quantizer Q11 cuts the 4 bits of the least significant bit ("LSB") of the 20-bit signal output from the multiplier M11, most values that may be represented by the 20-bit signal may be included in the 16-bit signal, but as in the fixed-point type C, the maximum range of the actual signal represented by the curve L1 may be exceeded.

When the quantizer Q11 cuts the 4 bits of the most significant bit ("MSB") of the 20-bit signal output from the multiplier M11, as in the fixed-point type A, it becomes difficult to include all of the range of the actual signal represented by the curve L1.

Therefore, like the fixed-point type B, it is desirable to set the range of the signal output from the quantizer Q11 such that it corresponds to the range of the actual signal represented by the curve L1. For such a setting, it is appropriate to set the quantizer Q11, based on measured data.

In addition, when data other than the measured data are input to the quantizer Q11, since overflow may occur, an overflow prevention clamp is also desirable.

A quantization setting method of the quantizer Q11 is as follows.

Since the range of the parameter w' is normalized to −1 to 1, when the bit width of the output signal of the quantizer Q11 is encoded 2 bits, the output signal of the quantizer Q11 may be quantized to [−1, 0, 1] by rounding. In addition, when the bit width of the output signal of the quantizer Q11 is greater than 2 bits, the output signal $z_q$ of the quantizer Q11 may be calculated by Equation 13 below.

$$z_q = \begin{cases} 1 & z > 1 \\ \text{round}(z \times 2^{t-1}) \div 2 & -1 < x \leq 1 \\ -1 & z \leq 1 \end{cases} \qquad \text{[Equation 13]}$$

In Equation 13, z is an input value to the quantizer Q11, that is, the output signal of the multiplier M11, and t is the bit width of the output signal of the quantizer Q11.

The output signal $z_q$ of the quantizer Q11 for the fixed-point type B of FIG. 4 may be calculated by Equation 14.

$$z_q = \begin{cases} M & z > M \\ \text{round}(z \times 2^{t-1} \div M) \div 2^{t-1} \times M & -M < z \leq M \\ -M & z \leq M \end{cases} \qquad \text{[Equation 14]}$$

In Equation 14, M=max(a, b), and a and b are in the range −a to b of the fixed-point type B of FIG. 4. Here, a and b are natural numbers other than 1.

Equation 14 is an example of a quantization method, and the present disclosure according to the invention is not limited thereto. In other embodiments, a fine quantization method may obtain good precision without using the maximum value. The quantization performance of the quantizer Q11 may be verified while changing the value of M in Equation 14.

According to the present disclosure as described above, the number used for multiplication and addition operations reaching hundreds of times of a neural network falls within the range of −1 to 1. The parameters A' and B', which are learning completion normalization parameters, may change in range depending on the learning result after completion of learning, but each of the number of changes is one. Even when the parameters A' and B' are changed, since the range of influence is limited, it is easy to redesign the hardware.

According to an embodiment of the present disclosure, in the neural network processing device, a learning parameter is converted to a value between −1 and 1, and an output signal is converted to a value between 0 and 1, thereby facilitating quantization. Accordingly, efficient hardware mounting of the neural network processing device becomes possible.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A neural network processing device comprising:
a convolution part which receives an input signal and a learning completion weight parameter, performs a convolution operation on the input signal and the learning completion weight parameter, and outputs a convolution signal that is a result value of the convolution operation, the convolution part comprising:
a multiplier which multiplies the input signal and the learning completion weight parameter; and
a quantizer which quantizes an output of the multiplier and outputs the convolution signal;
a batch adjustment part which receives the convolution signal and a learning completion normalization parameter, and outputs an adjustment signal obtained by adjusting an output deviation of the convolution signal; and
an activation part which converts the adjustment signal into an output signal based on an activation function;
wherein the quantizer performs a quantization operation corresponding to:

$$z_q = \begin{cases} M & z > M \\ \text{round}(z \times 2^{t-1} \div M) \div 2^{t-1} \times M & -M < z \leq M \\ -M & z \leq M \end{cases},$$

where z is the output of the multiplier, t is a bit width of the convolution signal, M is a maximum value in a range −a to b, a and b are natural numbers other than 1, and $z_q$ is the convolution signal; and
wherein the quantizer includes a quantization setting to set a range of the convolution signal output from the quantizer such that it corresponds to a floating-point type range of an actual signal represented by a curve of a distribution of a signal output from the multiplier, thereby converting to a fixed-point type range that reduces a number of bits required for quantization.

2. The neural network processing device of claim 1, wherein the activation part normalizes the output signal to a value between 0 and 1.

3. The neural network processing device of claim 1, wherein the learning completion weight parameter w' is calculated by the following Equation:

$$w' = \frac{w}{\max(|w|)},$$

where w is a learning parameter.

4. The neural network processing device of claim 1, wherein the learning completion normalization parameter is normalized to a value between −1 and 1.

5. The neural network processing device of claim 1, wherein the learning completion normalization parameter includes a first parameter and a second parameter, and
wherein the batch adjustment part includes:
a multiplier which multiplies the convolution signal and the first parameter;
a first quantizer which quantizes an output of the multiplier;
an adder which adds an output of the first quantizer and the second parameter; and
a second quantizer which quantizes an output of the adder.

6. The neural network processing device of claim 5, wherein the first parameter is a value calculated by the following Equation:

$$A' = \frac{\max(|w|)}{\max(|y|)} A,$$

where $\max(|w|)$ is a maximum value of an absolute value of a learning parameter w, $\max(|y|)$ is a maximum value of an absolute value of an output signal y, $$A = \frac{\gamma}{\sigma_B}, \gamma$$

is a learning parameter, and $\sigma_B$ is a standard deviation of the input signal.

7. The neural network processing device of claim 5, wherein the second parameter is a value calculated by the following Equation:

$$B' = \frac{B}{\max(|y|)},$$

where $\max(|y|)$ is a maximum value of an absolute value of an output signal y, $$B = \beta - \frac{\mu_B \gamma}{\sigma_B},$$

each of $\gamma$ and $\beta$ is a learning parameter, $\mu_B$ is a mean of the input signal, and $\sigma_B$ is a standard deviation of the input signal.

8. The neural network processing device of claim 1, wherein the activation part converts the adjustment signal into the output signal to have a value between 0 and 1, based on the activation function.

9. The neural network processing device of claim 1, wherein the input signal is an image signal.

10. A neural network processing device comprising:
an input layer;
an intermediate layer; and
an output layer, and
wherein the intermediate layer includes:
a convolution part which receives an input signal and a learning completion weight parameter from the input layer, performs a convolution operation on the input signal and the learning completion weight parameter, and outputs a convolution signal that is a result value of the convolution operation, the convolution part comprising:
a multiplier which multiplies the input signal and the learning completion weight parameter; and
a quantizer which quantizes an output of the multiplier and outputs the convolution signal;
a batch adjustment part which receives the convolution signal and a learning completion normalization parameter, and outputs an adjustment signal obtained by adjusting an output deviation of the convolution signal; and an activation part which converts the adjustment signal into an output signal based on an activation function and outputs the output signal to the output layer;
wherein the quantizer performs a quantization operation corresponding to:

$$z_q = \begin{cases} M & z > M \\ \text{round}(z \times 2^{t-1} \div M) \div 2^{t-1} \times M & -M < z \le M \\ -M & z \le M \end{cases},$$

where z is the output of the multiplier, t is a bit width of the convolution signal, M is a maximum value in a range −a to b, a and b are natural numbers other than 1, and $z_q$ is the convolution signal; and
wherein the quantizer includes a quantization setting to set a range of the convolution signal output from the quantizer such that it corresponds to a floating-point type range of an actual signal represented by a curve of a distribution of a signal output from the multiplier, thereby converting to a fixed-point type range that reduces a number of bits required for quantization.

11. The neural network processing device of claim 10, wherein the activation part normalizes the output signal to a value between 0 and 1.

12. The neural network processing device of claim 10, wherein the learning completion weight parameter w' is calculated by the following Equation:

$$w' = \frac{w}{\max(|w|)},$$

where w is a learning parameter.

13. The neural network processing device of claim 10, wherein the learning completion normalization parameter is normalized to a value between −1 and 1.

14. The neural network processing device of claim 10, wherein the learning completion normalization parameter includes a first parameter and a second parameter, and
wherein the batch adjustment part includes:
a multiplier which multiplies the convolution signal and the first parameter;
a first quantizer which quantizes an output of the multiplier;
an adder which adds an output of the first quantizer and the second parameter; and
a second quantizer which quantizes an output of the adder.

15. The neural network processing device of claim 14, wherein the first parameter is a value calculated by the following Equation:

$$A' = \frac{\max(|w|)}{\max(|y|)} A,$$

where max(|w|) is a maximum value of an absolute value of a learning parameter w, max(|y|) is a maximum value an absolute value of an output signal y, $$A = \frac{\gamma}{\sigma_B},$$

is a learning parameter, and $\sigma_B$ is a standard deviation of the input signal.

16. The neural network processing device of claim 14, wherein the second parameter is a value calculated by the following Equation:

$$B' = \frac{B}{\max(|y|)},$$

where max(|y|) is a maximum value of an absolute value of an output signal y, $$B = \beta - \frac{\mu_B \gamma}{\sigma_B},$$

each of γ and β is a learning parameter, $\mu_B$ is a mean of the input signal, and $\sigma_B$ is a standard deviation of the input signal.

* * * * *